United States Patent [19]
Van Linden et al.

[11] Patent Number: 4,983,216
[45] Date of Patent: Jan. 8, 1991

[54] ALUMINUM SCRAP MELTING

[75] Inventors: Jan H. L. Van Linden, Allison Park; Michael J. Kionosz, Apollo, both of Pa.; James R. Bowser, Maryville, Tenn.

[73] Assignee: Aluminum Company of America, Pittsburgh, Pa.

[21] Appl. No.: 478,455

[22] Filed: Feb. 12, 1990

[51] Int. Cl.$^5$ .............................................. C22B 21/06
[52] U.S. Cl. ...................................... 75/672; 75/687
[58] Field of Search ............ 75/68 R, 65, 24, 672 US, 75/687 US

[56] References Cited

U.S. PATENT DOCUMENTS 3,846,123  11/1974  Racunas et al. ................... 75/68 R
4,191,559  3/1980  Van Linden et al. ............... 75/68 R Primary Examiner—Melvin J. Andrews
Attorney, Agent, or Firm—Andrew Alexander

[57] ABSTRACT

Disclosed is a method of melting aluminum scrap and removing skim therefrom having reduced amounts of aluminum contained therein. Melted scrap and salt is added to a body of molten aluminum in a skim removal bay and a layer containing salt and skim is collected on the surface of the body, the layer containing high levels of molten aluminum in lower regions of said layer. The layer is treated so that upper regions thereof contain reduced amounts of aluminum, the treating aiding molten aluminum in the layer to return to the body. A portion of the treated layer is removed from upper regions thereof, the portion comprised of salt, skim and aluminum.

44 Claims, 2 Drawing Sheets

ALUMINUM SCRAP MELTING

INTRODUCTION

This invention relates to molten metals and more particularly it relates to melting of aluminum scrap and recovery of aluminum from skim formed during the melting.

Skim or dross normally associated with aluminum is usually comprised of a mixture of oxides, nitrides or carbides of aluminum which contains a high level of metallic or free aluminum. The skim can contain other non-metallic impurities, such as refractories. Further, the free aluminum entrained in the mixture can be 95% or higher of the total weight of the skim. Thus, it will be apparent that it is highly desirable to reclaim such free aluminum.

The present invention permits melting of aluminum scrap and separation of free aluminum from dross or skim formed during melting before the skim is removed from the molten aluminum.

SUMMARY OF THE INVENTION

An object of the present invention includes removing dross or skim and salt from molten metal.

Another object of the present invention includes separating dross or skim and salt from molten aluminum.

And yet another object of the present invention includes substantially decreasing the amount of molten aluminum entrained in skim using salt.

A further object of this invention is melting a feedstock of aluminum scrap and salt in a melting media.

Yet another object of the present invention is providing a feedstock of aluminum scrap and controlled amount of salt in molten aluminum and recovering salt-containing skim therefrom having low levels of free aluminum.

In accordance with these objects, there is provided a method for melting aluminum scrap and removing skim therefrom and reducing the amount of aluminum removed with the skim. The method comprises providing a body of molten aluminum, adding melted aluminum scrap and salt to the body, the salt having a melting point below that of the temperature of the body of molten aluminum, and collecting a layer of salt-containing skim generated during the melting on the surface of the body. The salt-containing skim layer has high levels of molten aluminum in lower regions thereof and is treated to reduce the amount of molten aluminum contained therein to provide a salt-containing skim product having reduced amounts of aluminum. The salt aids separation of molten aluminum from the skim. A portion of the salt-containing skim product is removed from the skim layer.

DETAILED DESCRIPTION OF THE PREFERRED EMBODIMENTS

Figure 1:
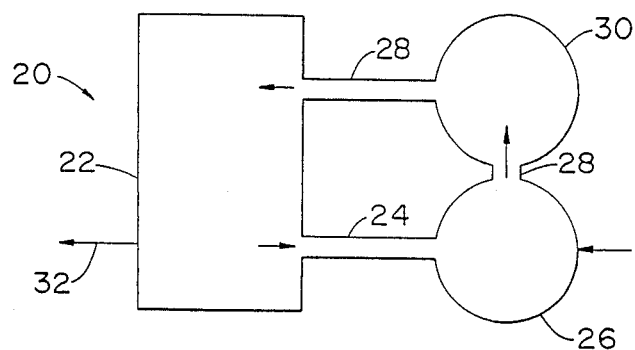
FIG. 1 is a general schematic of a circulatory melting system in accordance with the invention.

Referring now more specifically to FIG. 1, there is shown a schematic of a typical circulatory melting system 20 in accordance with the present invention. In circulatory melting system 20, molten melting media is circulated from the heating bay or area 22 along line 24 to a bay or area 26 wherein pumping, salt and aluminum scrap charging and melting may be accomplished. Thereafter, the melt is circulated back to the heating bay 22 via line 28 which passes through a skim treatment and removal bay or area 30. The heating bay can have a discharge line 32 which can discharge molten metal at a rate commensurate with the feed rate of aluminum scrap to bay 26. Aluminum as used herein includes aluminum and alloys thereof.

Thus, the system can be operated on a continuous basis. If the molten metal circulation rate is controlled by the feedstock rate, then the temperature drop exiting and entering the heating bay is constant and the system can be operated under steady state conditions.

The melting media may be heated in heating bay 22 by combustion units discharging their heat upon its surface. Alternatively, electric resistance heaters immersed in the molten media may be used.

The melting media can be molten metal of similar composition to the metal charge. When molten aluminum is the melting media, a typical temperature leaving the heating bay 22 is about 1400° F. although this temperature can range from 1325° to 1475° F. but with a higher temperature there is a greater tendency to form greater amounts of skim. A typical temperature reentering heating bay 22 is about 1300° F. This provides about a 100° F. temperature drop across the melting bay to provide heat to melt the charge.

In this type of system, skim is generated by virtue of the scrap melting process. Thus, it is in this type of operation that the present invention has particular application for the efficient removal of skim.

Figure 2:
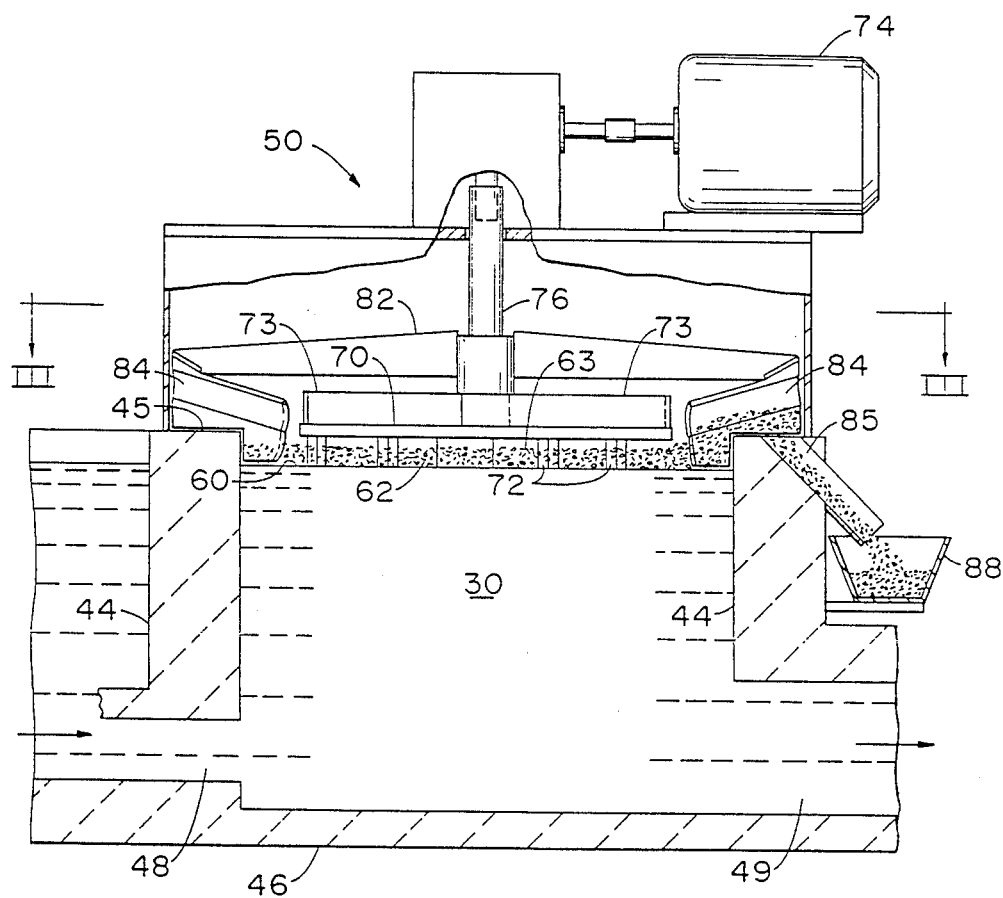
FIG. 2 is an enlarged view in cross section of a skim layer treating and skim removal mechanism in accordance with the invention.

The scrap charge or feedstock to bay 26 can comprise aluminum scrap and salt. By salt as used herein is meant to include a single salt or a mixture of salts. Preferably, the salt is mixed with aluminum scrap in the dry state. However, the salt in the molten state, for example, may be added with the scrap or separately. Feedstock as used herein is meant to include scrap mixed with salt which is then charged or ingested into a molten melting media or scrap and salt which is charged or ingested independently. For example, the salt may be injected directly into the skim bay underneath the layer of skim. The salt can comprise 1 to 20 wt. % of the feedstock, the remainder aluminum scrap. Preferably, the salt in the feedstock is in the range of 1 to 12 wt. % with typical amounts being in the range of about 2 to 6 wt. %, particularly, if the aluminum scrap in the feedstock contains large amounts of used beverage containers, preferably shredded, where typically the bodies are AA3004 and the ends are AA5182. The salt preferably has a melting point below that of the melting point of the body of aluminum, and preferably, the salt has a melting point of less than 1250° F. Halide salts such as alkaline earth metal halides or alkali metal halides, or mixtures thereof, may be used. Such salts can include Li, Na, K, Mg, Ca halides, such as chlorides or fluorides. The fluoride salts enhance the wettability of the oxides with the salt. Preferably, the salt is comprised of sodium chloride and potassium chloride. It may be desirable in some instances to add fluoride salt such as calcium fluoride or cryolite. The salt may comprise 45 to 65 wt. % NaCl, 35 to 55 wt. % KCl and up to 5 wt. % of the fluoride salt such as KF, $CaF_2$ or $NaAlF_2$. It is important that the salts are in a molten state, particularly when initially present in skim layer 62 (FIG. 2). That is, it is in the molten state that the salt most effectively aids in initially separating molten aluminum from the oxides in the skim layer. Thus, in one aspect of the invention, the addition or presence of salt in the skim layer in the skim bay is effective in reducing melt loss, and levels of melt loss as low as 8% can be achieved. Thus, the presence of salt in the skim layer is a treatment for reducing melt loss within the purview of the invention.

Referring now to FIG. 2, there is shown an apparatus referred to generally as 50 suitable for treating salt-containing skim on a body of molten aluminum in accordance with the invention. The treatment results in a salt-containing skim product having lowered free aluminum, concentrated oxides and a controlled level of salt. With respect to one important aspect of the invention, as shown in FIG. 2, the salt-containing skim is treated to recover available aluminum contained therein prior to the skim product being removed from the body of molten aluminum. The apparatus comprises skim treatment bay 30 having side walls 44 and bottom wall 46. An entrance 48 is provided for purposes of introducing molten metal, skim and molten salt to bay 30. The molten metal is circulated from heating bay 22. An exit 49 is provided for purposes of removing or returning metal from skim removal bay 30 to the heating bay.

When feedstock enters skim treatment bay 30 via entrance 48, oxides and molten salt rise to molten metal surface 60 in bay 30 because the oxides and salt have a lower density than the molten metal. A layer of skim 62 accumulates on top of the molten aluminum in bay 30 as feedstock is ingested in bay 26 (FIG. 1).

In FIG. 2, there is shown a blade 70 having fins 72 projecting into salt-containing skim layer 62. Blade 70 and fins 72 act to create movement in the upper regions of the salt-containing skim layer as the blade rotates. Motor 74 is connected to the blade by shaft 76. The motor provides controlled rotations of the blade. Typically, rotation is in the range of 2 to 25 rpm with suitable rotation being 8 to 15 rpm. Rotation of blade 70 provides a mixing motion in the salt-containing skim layer. This motion operates to free molten aluminum occlude with the oxides in the skim. Additionally, the salt in the skim aids in release of the aluminum from the oxide by having a preferential attraction for the oxides in the skim. This preferential attraction aids in releasing molten aluminum from the oxide particles in the skim. Fins or vanes 72 provide a path for released molten aluminum droplets to drain back to the molten aluminum in bay 30. It is the release of molten aluminum from the oxide particles in the skim layer by action of blade 70 and salts that is so important to the present invention in recovering or reducing the amount of aluminum in the skim layer. A hanger 82 is located above blade 70 and carries scoops 84 which operate to remove salt-containing skim from the upper regions of the skim layer and to deposit it in trough 88 through opening 85. Scoops 84 also sweep the top 45 of wall 44 and permit skim to exit through opening 85 to trough 88. Scoops 84 have extensions 89 which sweep the inside top portion of wall 44 (FIG. 2) to insure against build-up or freezing of skim and the wall which would eventually stop rotation of blade 70.

Figure 3:
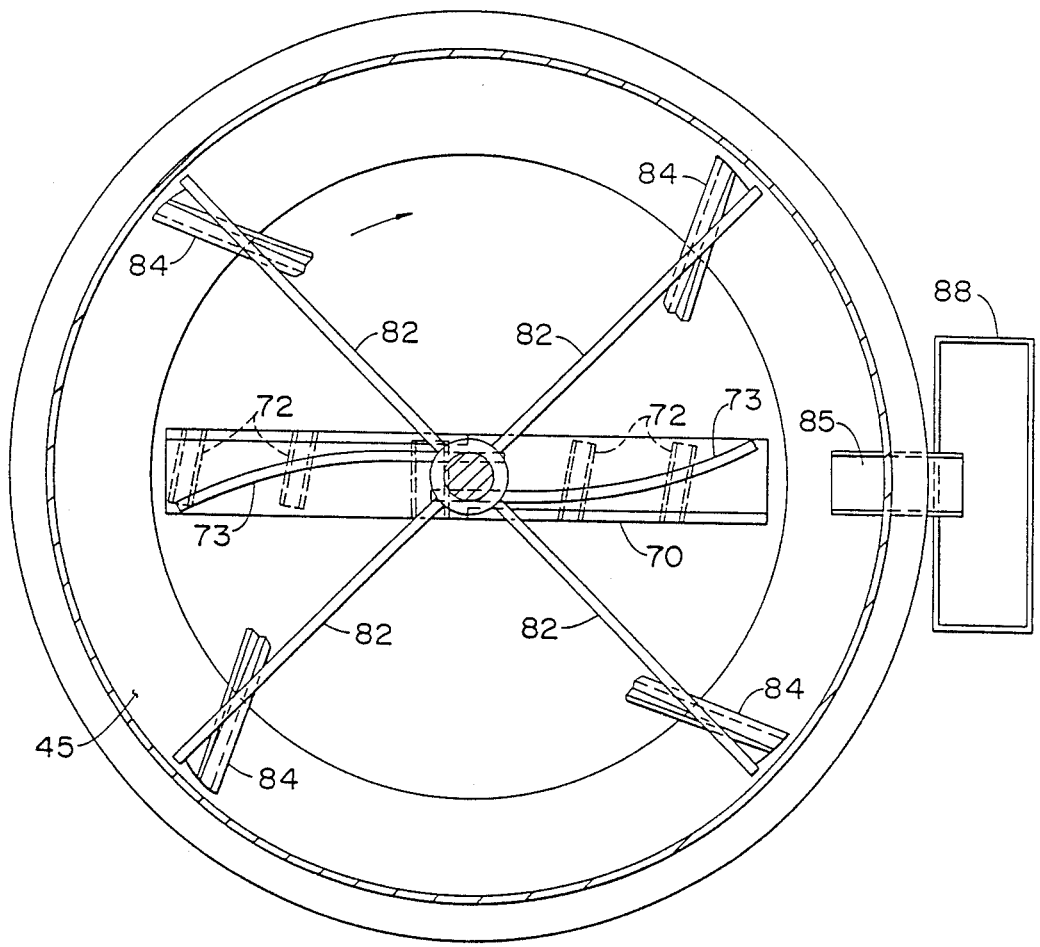
FIG. 3 is a cross-sectional view of the skim layer treating and skim removal mechanism taken along the line III—III of FIG. 2.

FIG. 3 shows a top view of hangers 82 and blade 70. In this view, four scoops 84 are shown attached to hangers 82. Further, opening 85 is shown through which skim exits to trough 88. Blade 70 and hangers 82 are positioned for moving in a clockwise direction. The angle of fins or vanes 72 are shown (in outline form) underneath blade 70. On top of blade 70 are positioned two members 73 which may be shaped as shown and which aid vanes 72 in moving skim radially outward particularly if large amounts of skim are encountered. Thus, it will be seen that as blade 70 turns, the skim layer is mixed or stirred and moved radially outwardly. The stirring motion also acts to shear droplets of molten aluminum and to permit coalescence thereof. Also, the stirring provides a path through the skim layer to the molten metal in bay 30. The vanes may be fabricated from a ceramic material to provide for extended life.

Other stirring or mixing operation may be used to aid in recovering molten aluminum from the skim layer. Further, other methods of removing treated skim from the skim layer include raking and suction.

Fluxing gases suitable for molten aluminum may be used in conjunction with the salt to supplement its fluxing action and include the so-called inert gases; namely, helium, neon, argon, kryton, xenon, along with nitrogen, carbon dioxide and mixtures of these gases. In addition, chlorinaceous gas such as chlorine may be used individually or combined with the above gases.

The skim layer can have a depth of from about 2 to 8 inches, typically 2 to 5 inches. At the interface of the skim layer and the molten metal and in the lower region of the skim layer, the salt in the skim layer is liquid and, therefore, aids in releasing molten aluminum occluded in the oxide of the skim layer. It is believed that the molten salt preferentially wets the oxides and such materials in the skim layer and by such action forces molten aluminum to coalesce in droplets independent of the oxides. In the upper regions of the skim layer at or adjacent blade 70, the salt tends to be in a drier or solid state and provides a coating over the oxide particles in the skim layer. This aspect is important in that it aids in preventing further oxidation of aluminum remaining in the skim as it gets exposed to air at the top of the skim layer or as a portion of the salt-containing skim product is removed. The salt-containing skim product, as it is removed from the skim layer, has an average particle size in the range of 0.05 to 0.5 inch. It will be noted that as portions of the salt-containing skim product are removed, the skim (e.g., oxides, aluminum and salt) in layer 62 moves upwardly and molten aluminum moves downwardly. Further, as the skim moves upwardly and aluminum is freed, salt and oxides concentrate in the skim layer as free aluminum is depleted. The higher concentration of salt is important for another reason. That is, as skim moves towards the upper regions of the skim layer, it can become drier as a result of molten aluminum droplets coalescing and returning to the body of molten aluminum. Thus, because of the dryness and temperature, skim fires can be encountered with their attendant problems. With higher concentrations of salt, particularly at or close to the surface of the skim layer, skim fires are practically eliminated. If a skim fire does start, this may be controlled or put out by addition of salt directly onto the top of skim layer 62. A sensor may be provided to sense the heat from the fire. This can be relayed to a feeder for injecting controlled amounts of salt until the temperature is lowered to normal operating conditions. It is important that the amount of salt be controlled because high concentrations of salt can result in wet skim which sticks or freezes and stops operation of the system. Too little salt can result in skim fires and permit more oxidation of residual aluminum occluded in the skim.

When skim layer 62 is treated sufficiently in upper regions 63 thereof, aluminum is reduced in skim layer 62 from 55 to 90 wt. % to an aluminum concentration of 50 wt. % or less, e.g., typically less than 40 wt. %. Thus, it can be seen that there is a high level of recovery of aluminum.

The product recovered from the skim layer can contain 30 to 70 wt. % salt, typically 35 to 65 wt. % salt, 25 to 60 wt. % aluminum, typically 30 to 45 wt. % aluminum, the remainder oxides and impurities. This provides a useful product for processing by secondary smelters where salt, aluminum and oxides may be processed further to recover salt and aluminum. Such processing may include electrolyzing the skim product in a suitable electrolytic cell to reduce the oxides, thereby releasing the remaining aluminum in the skim product and recovering the salt for further use.

In operation of the present invention, a circulating flow rate of 600,000 lbs/hr of molten aluminum was established from heating bay 22 through charging or ingesting bay 26 and skim bay 30 back to the heating bay. The temperature entering charging bay 26 was 1400° F. and exiting bay 26 was about 1370° F. An aluminum scrap and salt feed was added at a rate of 9000 lbs/hr into charging bay 26, the salt constituting 3% of the feed. The salt contained 49 wt. % NaCl, 49 wt. % KCl, 0.3 wt. % KF and the remainder impurities. A skim layer in the skim bay was maintained at a thickness of 3 inches. The blade in the skim bay was rotated 11 rpm. The resulting melt loss was 3%. This is a marked improvement over other systems where the melt loss can be 14 up to 50%.

Having thus described the invention, what is claimed is:

1. A method of melting aluminum scrap and removing skim therefrom having reduced amounts of aluminum contained therein comprising:
    (a) providing a body of molten aluminum having a surface in a skim removal bay;
    (b) adding melted scrap and salt to said body;
    (c) collecting a layer containing salt and skim on a surface of the body in said skim removal bay, the layer containing high levels of molten aluminum in lower regions of said layer;
    (d) treating the layer so that upper regions of said layer contain reduced amounts of aluminum, the treating aiding molten aluminum in the layer to return to said body; and
    (e) removing a portion of the treated layer from upper regions thereof, the portion comprised of salt, skim and aluminum.

2. The method in accordance with claim 1 wherein the molten aluminum body is in a temperature range of about 1300° to 1475° F.

3. The method in accordance with claim 1 wherein the amount of salt added to the body is in the range of 1 to 20 wt. % based on the amount of aluminum scrap and salt added.

4. The method in accordance with claim 1 wherein the amount of salt added to the body is in the range of 1 to 12 wt. % based on the amount of aluminum scrap and salt added.

5. The method in accordance with claim 1 wherein the amount of salt added to the body is in the range of 2 to 6 wt. % based on the amount of aluminum scrap and salt added.

6. The method in accordance with claim 1 wherein the salt has a melting point below the temperature of the body of molten aluminum.

7. The method in accordance with claim 1 wherein the salt has a melting point of less than 1250° F.

8. The method in accordance with claim 1 wherein the salt is selected from alkaline earth metal halides and alkali metal halides and mixtures thereof.

9. The method in accordance with claim 1 wherein the salt is comprised of sodium chloride, potassium chloride and fluoride salt.

10. The method in accordance with claim 1 wherein said treating is stirring to permit aluminum in the layer to return to said body.

11. The method in accordance with claim 1 wherein treating is achieved by means of a rotating blade having fins projecting into upper regions of said layer.

12. The method in accordance with claim 1 wherein aluminum scrap and salt are mixed and added.

13. The method in accordance with claim 1 wherein the salt is added into the skim bay below said layer.

14. The method in accordance with claim 1 wherein the salt is molten in lower regions of said layer at or near said surface.

15. The method in accordance with claim 1 wherein the salt is solid in upper regions of said layer.

16. The method in accordance with claim 1 wherein the portion removed has an average particle size in the range of 0.05 to 0.5 inch.

17. The method in accordance with claim 1 wherein the portion removed contains 20 to 70 wt. % salt.

18. The method in accordance with claim 1 wherein the portion removed contains 35 to 65 wt. % salt.

19. The method in accordance with claim 1 wherein the portion removed contains less than 50 wt. % free aluminum.

20. The method in accordance with claim 1 wherein the portion removed contains 30 to 45 wt. % free aluminum.

21. The method in accordance with claim 1 wherein the composition of the portion removed is 35 to 65 wt. % salt, less than 45 wt. % free aluminum, the remainder skim.

22. A method of melting aluminum scrap and removing skim therefrom having reduced amounts of aluminum removed with the skim comprising:
    (a) providing a body of molten aluminum having a surface in a skim removal bay;
    (b) adding the melted scrap and salt to said skim removal bay, the salt being added in the range of 1 to 20 wt. % based on scrap added and having a melting point less than 1250° F. and selected from alkaline earth metal halides and alkali metal halides;
    (c) collecting a layer containing salt and skim on the surface of said body in said skim removal bay, the layer containing 55 to 90 wt.% molten aluminum in lower regions thereof;
    (d) treating the layer so that upper regions of said layer contain less than 50 wt. % aluminum, the treating achieved by stirring, thereby aiding molten aluminum in the layer to return to said body; and (e) removing a portion of the treated layer from upper regions thereof, the portion containing 30 to 70 wt. % salt, the remainder skim and aluminum.

23. A method of melting aluminum scrap containing used food and beverage containers and removing skim therefrom having reduced amounts of aluminum removed with the skim comprising:
 (a) providing a body of molten aluminum having a surface in a skim removal bay;
 (b) adding the melted scrap and salt to said skim removal bay, the salt being added in the range of 1 to 20 wt. % based on the scrap added having a melting point less than 1250° F. and selected from alkaline earth metal halides and alkali metal halides;
 (c) collecting a layer containing salt and skim on the surface of said body in the skim removal bay, the layer containing 55 to 90 wt. % molten aluminum in lower regions of said layer;
 (d) treating the layer so that upper regions of said layer have less than 45 wt. % aluminum, the treating achieved by stirring, thereby aiding molten aluminum in the layer to return to said body, the salt being molten in lower regions of said layer and being solidified in upper regions of said layer; and
 (e) removing a portion of the treated layer, the portion containing 30 to 70 wt. % salt, the remainder skim and aluminum and having an average particle size in the range of 0.05 to 0.5 inch.

24. In a continuous method for melting aluminum scrap and removing skim therefrom in a recirculating system having a heating area, a scrap charging area and a skim removal area wherein molten aluminum is circulated from the heating area to the charging area and through the skim removal area back to the heating area, the skim removed therefrom having reduced amounts of aluminum contained therein, the improvement comprising:
 (a) ingesting aluminum scrap and salt into the molten aluminum;
 (b) collecting a layer containing skim and salt on the surface of the molten aluminum in the skim removal area, the layer containing high levels of molten aluminum in lower regions of said layer;
 (c) treating the layer so that upper regions of said layer contain reduced amounts of aluminum, the treating aiding molten aluminum contained in the layer to return to the molten aluminum which is circulating; and
 (d) removing a portion from said upper regions of the layer.

25. The method in accordance with claim 24 wherein the temperature of the molten aluminum which is circulated is in the range of about 1300° to 1475° F.

26. The method in accordance with claim 24 wherein the amount of salt ingested is in the range of 1 to 20 wt .% based on the amount of aluminum scrap and salt added.

27. The method in accordance with claim 24 wherein the amount of salt added to the body is in the range of 1 to 12 wt. % based on the amount of aluminum scrap added.

28. The method in accordance with claim 24 wherein the amount of salt added to the body is in the range of 2 to 6 wt. % based on the amount of aluminum scrap added.

29. The method in accordance with claim 24 wherein the salt has a melting point below that of the molten aluminum.

30. The method in accordance with claim 24 wherein the salt has a melting point of less than 1250° F.

31. The method in accordance with claim 24 wherein the salt is selected from alkaline earth metal halides and alkali metal halides.

32. The method in accordance with claim 24 wherein the salt is comprised of sodium chloride, potassium chloride and fluoride salt.

33. The method in accordance with claim 24 wherein said treating is stirring to permit aluminum in the layer to return to said body.

34. The method in accordance with claim 24 wherein treating is achieved by means of a rotating blade having fins projecting into said layer.

35. The method in accordance with claim 24 wherein aluminum scrap and salt are combined for ingesting.

36. The method in accordance with claim 24 wherein the salt is molten in lower regions of said layer at or near said surface.

37. The method in accordance with claim 24 wherein the salt is solid in upper regions of said layer.

38. The method in accordance with claim 24 wherein the portion removed has an average particle size in the range of 0.05 to 0.5 inch.

39. The method in accordance with claim 24 wherein the portion removed contains 20 to 70 wt. % salt.

40. The method in accordance with claim 24 wherein the portion removed contains 35 to 65 wt. % salt.

41. The method in accordance with claim 24 wherein the portion removed contains less than 50 wt. % free aluminum.

42. The method in accordance with claim 24 wherein the portion removed contains 30 to 45 wt. % free aluminum.

43. In an improved method for melting aluminum scrap and removing skim therefrom in a recirculating system having a heating area, a scrap charging area and a skim removal area wherein molten aluminum is circulated from the heating area to the charging area and through the skim removal area back to the heating area, the skim removed therefrom having reduced amounts of aluminum contained therein, the improvement comprising:
 (a) melting aluminum scrap and salt into the molten aluminum in the scrap charging area, the salt being present in the range of 1 to 20 wt. % based on the total weight of the scrap and salt, the salt having a melting point of less than 1250° F. and selected from alkaline earth metal halides and alkali metal halides;
 (b) collecting a layer containing skim and salt from the melting step on the molten aluminum in the skim removal area, the layer containing 55 to 95 wt. % molten aluminum in lower regions of said layer;
 (c) treating the layer so that upper regions of said layer contain less than 50 wt. % aluminum, the treating achieved by stirring the layer thereby aiding molten aluminum in the layer to return to the molten aluminum which is circulating; and
 (d) removing a portion from upper regions of the layer, the portion containing 30 to 70 wt. % salt, the remainder skim and aluminum.

44. In a method for melting aluminum scrap and removing skim therefrom in a substantially continuous recirculating system having a heating area, a scrap charging area and a skim removal area wherein molten aluminum is circulated from the heating area to the charging area and through the skim removal area back to the heating area, the skim removed therefrom in the skim removal area, the improvement comprising:

(a) melting aluminum scrap and salt into the molten aluminum in the scrap charging area, the salt being present in the range of 1 to 20 wt. % based on the total weight of the scrap and salt, the salt having a melting point of less than 1250° F. and selected from alkaline earth metal halides and alkali metal halides;

(b) collecting a layer containing skim and salt from the melting step on the molten aluminum in the skim removal area, the layer containing 55 to 95 wt. % molten aluminum in lower regions of said layer;

(c) substantially continuously treating the layer so that upper regions of said layer contain less than 50 wt. % aluminum by aiding aluminum to return to the molten aluminum beneath the skim-salt layer, the treating achieved by moving fins therethrough to move portions of the layer in a generally outwardly manner and by substantially continuously moving other fins in outer regions of said layer to move portions of said layer outwardly for separation therefrom; and (d) removing a portion from upper regions of the skim-salt layer, the portion containing 30 to 70 wt. % salt, the remainder skim and aluminum, said improvement resulting in reduced amounts of aluminum in said skim-salt portion removed.

* * * * *